United States Patent [19]

Böhme et al.

[11] 4,166,401

[45] Sep. 4, 1979

[54] GEAR MEANS FOR CONTROL OF PLANETARIA PROJECTORS

[75] Inventors: Helmut Böhme; Gerhard Vogel, both of Jena, German Democratic Rep.

[73] Assignee: Jenoptik Jena G.m.b.H., Jena, German Democratic Rep.

[21] Appl. No.: 870,770

[22] Filed: Feb. 7, 1978

[30] Foreign Application Priority Data

Apr. 2, 1977 [DD] German Democratic Rep. ... 197354

[51] Int. Cl.² .............................................. F16H 1/28
[52] U.S. Cl. ..................................... 74/802; 35/42.5; 74/414
[58] Field of Search .................... 74/802, 414; 35/42.5

[56] References Cited

U.S. PATENT DOCUMENTS

| | | | |
|---|---|---|---|
| 2,748,652 | 6/1956 | Bauersfeld et al. | 35/42.5 |
| 3,753,300 | 8/1973 | Mosley | 35/42.5 |
| 3,934,358 | 1/1976 | Kitano et al. | 35/42.5 |

Primary Examiner—Ronald C. Capossela

[57] ABSTRACT

This invention is in concern of a gear means for control of planet projectors in planetaria which does without a continuous year's axis shaft. The orbit speeds for the respective projectors are derived from the preceding one in such a manner that, by use of planetary gears and by definite transmission ratios of the toothed components, the speed is transmitted from the faster rotating projectors to the slower rotating projectors. The projectors are mounted on discs which are driven at the correct speed. The toothed components of the planetary gears are also seated on said discs. The toothed components mesh with gear wheels which are mounted on a tubular shaft which holds the entire gear arrangement, thus effecting the speed transformation. The inventional gear arrangement is used to simulate planet movements in planetaria.

1 Claim, 1 Drawing Figure

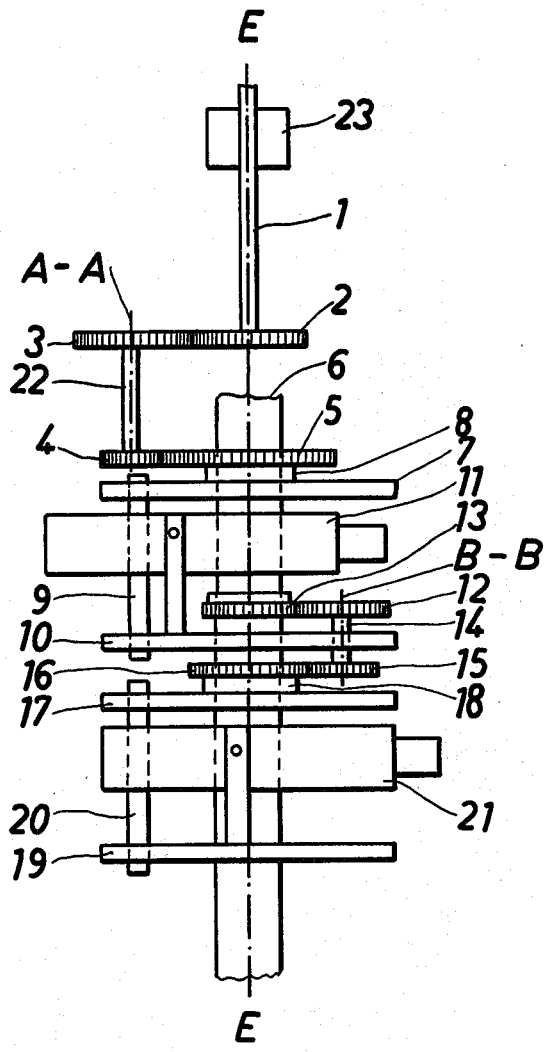

GEAR MEANS FOR CONTROL OF PLANETARIA PROJECTORS

This invention concerns a gear means particular for controlling planetaria projectors comprising a drive axle which is substantially in parallel to the ecliptic axis. The drive axle has at one of its end portions at least a first driven gear wheel which meshes with a first drive gear wheel seated on a shaft which in turn carries a second driven gear wheel. The shaft is rotatable about an axis substantially parallel to the ecliptic axis. The first driven gear wheel further meshes with a second drive gear wheel which is seated for rotation on a hollow shaft in parallel to the ecliptic axis.

In order to simulate the orbital movements of the planets in planetaria a control means for the respective planetaria projectors has to be provided which defines the direction of the projector, under which the planet is observed from a view-point on the earth.

To this purpose previous planetaria employ a continuous shaft, which represents the year's axis, with respect to each planet orbit, and which drives the earth orbit disc via a first gear means about an axis parallel to the year's axis and, via a further gear means, the orbits of the respective other planets inclined relative to the earth disc at a definite angle. The connection between two fixed points on both discs determines the direction of the respective projector means. It is, however, a disadvantage that speed ratios corresponding to the orbit relations of the planets have to be realised in the course of the transmission of the year's axis rotations to the driven orbit discs of the individual planets. Therefore expensive gears are necessary to produce the reduced or increased speeds with respect to each individual planet orbit so that the simulated planets move with the precision necessary.

Other known planetaria use a common orbit disc to represent the movements of the planet orbits, in which one disc operates two planets. Though such an arrangement only requires three times the earth orbits to represent the five planets visible to the unaided eye and the sun, a very complicated gearing is necessary.

In a further known planetarium projector, a planetary gear system is used to control the individual planet projectors. Here again only one drive shaft, the year's axis, is employed, which drives one earth orbit disc for each respective planet lying within the orbit of the earth, namely Mercury and Venus. On these discs the planet orbits are realised by means of planetary gears. With respect to the superior planets Mars, Jupiter, Saturn, the drive shaft drives the respective planet discs, on which the earth orbit is realised by means of planetary gears. Also this arrangement requires a continuous adaptation of the rotation transmission into reduced or set up movements with respect to the drive shaft in order to convey the correct speed to the individual projector discs. The expenditure in toothed elements is considerable which involves a backlash above neglect.

It is an object of the present invention to obviate the above disadvantages.

It is a further object of the present invention to provide a planetarium projector control which considerably reduces the expenditures in gear means and thus substantially eliminates the backlash otherwise involved.

It is still a further object of the present invention to provide a planetarium projector control in which by use of a suitable step arrangement of projector discs driven by respective gear means in sequence the fast moving projectors are followed by projectors of stepwise or continuously reduced speed.

These and other objects are realised by an arrangement in which a first disc seated on a shaft for rotation about the ecliptic axis and fast to a second drive gear wheel, forms a gear unit with a second disc which is seated for rotation about the same shaft. Said second disc is fast to said first disc by an engaging piece. Said gear unit serves to drive a first planet projector with the required speed. In order to drive a second planet projector which has a different rotational speed compared to the first planet projector, it is of advantage to mount a third drive gear wheel on the shaft adjacent to the second disc. Said third drive gear wheel meshes with a third driven gear wheel which is seated on the second disc for rotations substantially in parallel to the ecliptic axis. This third driven gear wheel is rigidly connected to a fourth gear wheel different from the former one, which fourth gear wheel in turn meshes with a fifth gear wheel mounted on the shaft for rotations about the axis of ecliptic. Said fifth gear wheel serves to drive a further gear unit similar so that for control of the first planet projector. Such gear units can be employed in sequence to control a fourth and a fifth planet projector. Herein the respective gear unit preceding the next one is used as a drive means. Such a serially connected arrangement of gear units for providing the orbit speeds of the individual planets advantageously compares to the previous art, because the number of toothed components is considerably reduced by the exploitation of the preceding orbital speed and the respective transformation to produce the following orbital speed, since the drive shaft has not to produce each individual planet movement for each planet separately.

In order that the invention may be more readily understood reference is made to the accompanying drawing which illustrates diagrammatically and by way of example one embodiment thereof and where the FIGURE is a schematical side view of a part of a planet projector control unit as used in planetaria.

A drive axle 1 driven by a servo-motor 23 is seated for rotation about an axis E—E which corresponds to the ecliptic axis or which is at least in parallel to the latter. A driven gear 2 which is non-displaceably connected with respect to the axle 1 meshes with a gear wheel 3. The latter is connected via a rotational axle 22, which is in parallel to the axis E—E to a driven gear wheel 4, which, in turn, meshes with a gear wheel 5 seated for rotation about the axis E—E on a shaft 6. A disc 7 and the gear wheel 5 are non-displaceably connected by a socket 8 to permit common rotations about the axis E—E. A pin 9 connects a disc 10 to the disc 7. The disc 10 which is rotatable about the axis E—E carries a planet projector 11. The disc 10 is further provided with an axle 14 at spaced parallel relation to the axis E—E. Said axle 14 carries a gear wheel 12 rotatable about an axis B—B for meshing with a driven gear wheel 13 which, in turn, is fast to the shaft 6. The gear wheel 12 is connected via the axle 14 to a gear wheel 15 which meshes with a gear wheel 16 seated for rotation about the axis E—E on the shaft 6. The drive gear wheel 16 is non-displaceably connected to a disc 17 by means of a socket 18. The disc 17 is rotatable about the axis E—E. A pin 20 connects the disc 17 to a disc 10 which carries a planet projector 21. The axle 1 is driven by the servo-motor at a constant speed. The movement is conveyed by the gear wheel 2 to the gear wheel 3, the transmission ratio being 13:15. The latter wheel transmits the movement via the wheel 4 to the wheel 5, the transmission ratio of 27:157 being so selected that the wheel 5 rotates about the axis E—E at a speed which corresponds to the orbit time of the planet Mars around the Sun. This rotational movement is transmitted by the disc 7 connected to the gear wheel 5 via the pin 9 to the disc 10 which carries the respective planet projector 11. Due to the rotational movement of the disc 10 the gear wheel 12 drives the gear wheel 13 at a 3:4 transmission ratio. This rotational movement, in turn, is transmitted via the gear wheel 15 to the gear wheel 16. The transmission ratio of 65:103 between the gear wheels 15 and 16 is selected in such a manner that the gear wheel 16 rotates about the axis E—E with a speed which corresponds to the orbit time of a further planet to be represented around the Sun. The disc 17, connected to the gear wheel 16, transmits the movement via the pinion 20 to the disc 19 upon which the planet projector 21 is mounted. In analogy to the above arrangement, further gear wheels connected to the disc 19 and similar to those on disc 10, can be realised to simulate further planet orbit movements by the respective transmission ratios. According to the arrangement of drive wheels and driven wheels on the projector discs the faster moving planet projectors are followed by slower moving ones or, by reversion of the above arrangement, vice versa. Further means, for example, means for representing loop movements of planets as can be observed from the earth and means for representing the orbit inclinations, are omitted for the sake of more simplicity.

We claim:

1. Gear means particularly for control of planet projectors in a planetarium,
    comprising
    a drive axle substantially in parallel to the ecliptic axis of the planetarium,
    a first gear wheel mounted on an end portion of said drive axle,
    a first driven axle being in parallel to said drive axle,
    a second gear wheel meshing with said first gear wheel,
    a third gear wheel and said second gear wheel being rigidly connected to said first driven axle,
    a fourth gear wheel,
    a shaft being substantially in parallel to said ecliptic axis,
    a first disc and a second disc seated for rotations about said shaft,
    a first pinion rigidly connecting said first disc and said second disc,
    said fourth gear wheel being seated for rotations about said shaft, meshing with said third gear wheel and being connected to said first disc,
    a first planet projector being mounted on said second disc,
    a fifth gear wheel being rigidly mounted on said shaft between said first and said second disc,
    a second driven axle being seated in said second disc substantially in parallel to the ecliptic axis and passing said second disc,
    a sixth gear wheel being secured to one end portion of said second driven axle and meshing with said fifth gear wheel,
    a seventh gear wheel being secured to the other end portion of said second driven axle,
    an eighth gear wheel being seated for rotations on and about said shaft and meshing with said seventh gear wheel,
    a third and a fourth disc being seated for rotations on and about said shaft,
    said third disc being rigidly connected to said eighth gear wheel,
    a second pinion rigidly connecting the third and the fourth disc,
    and a second planet projector being mounted on said fourth disc.

* * * * *